Feb. 9, 1954  L. BUSTIN  2,668,484
GRATING
Filed Dec. 18, 1950

INVENTOR.
LEOPOLD BUSTIN.
BY
ATTORNEY.

UNITED STATES PATENT OFFICE 2,668,484

GRATING

Leopold Bustin, Mamaroneck, N. Y.

Application December 18, 1950, Serial No. 201,354

2 Claims. (Cl. 94—5)

This invention relates to a non-skid grating.

Non-skid gratings are used in many industries and in other applications to prevent or at least to resist skidding and slipping both of vehicles and workmen. An illustration is the use of non-skid gratings on the floors of slaughter houses. Other illustrations are the use of non-skid gratings in automobile lubrication pits, landing craft, other ships and conveyances, gun mounts and wherever firm foothold is required. In all applications, the grating must be provided with a skid-proof tread on its top surface. In some applications it is necessary that the grating have a skid-proof tread on its bottom surface as well. The skid-proof tread on its top surface is intended to prevent the tires of the vehicles and the boots of the workmen from skidding or slipping. The skid-proof tread on the bottom surface is intended to prevent the grating itself from slipping or otherwise shifting on the surface which supports it.

Where the grating is used in slaughter houses, ice cream plants, and in other applications where problems of sanitation are encountered, a non-skid surface is not alone sufficient. Equally as important is a construction which can be flushed through and cleaned without raising the grating off the floor. The construction must be such as to be free from traps where the materials being handled by the workmen might collect or accumulate.

It is the principal object of this invention to provide a grating which possesses the following characteristics and features: it has a non-skid tread on its top surface; it has a non-skid tread on its bottom surface; and it is free from traps where the materials being handled might collect.

The grating which is herein described and claimed is provided with a plurality of spaced, pointed projections on its top surface which constitute the top tread thereof, and a plurality of spaced, pointed projections on its bottom surface which constitute its bottom tread. The top tread resists skidding by the tires of motor vehicles which travel on it and it resists slipping by the boots of workmen who stand or walk on it. The bottom tread tends to prevent the grating itself from slipping or shifting on the floor or other horizontal surface which supports it.

More specifically, the grating constituting the present invention comprises a plurality of corrugated bars which are secured to each other along their respective corrugations. Spaced openings are accordingly formed between the corrugated bars. Each bar is provided along its two side edges with a plurality of spaced, pointed projections. It is these projections which constitute the tread of the grating when the bars are secured together along their respective corrugations.

The projections which constitute the bottom tread of the grating are the only parts of the grating that rest upon the floor. Hence it is possible to flush the grating clean without raising it up from the floor by simply washing all foreign matter through its spaced openings and through the open spaces which separate and surround the downwardly extending pointed projections. An important feature or advantage resulting from the presence of pointed projections on both surfaces of the grating is that either side of the grating may be used as the top tread and whether the one side or the other is used as the top tread, the grating may be flushed clean without raising it off the floor.

Preferred embodiments of this invention are shown in the accompanying drawing, in which:

Fig. 1 is a fragmentary, perspective view of one of the bars used in making the present grating, said bar being shown flat and notched along both of its side edges to provide the spaced, pointed projections herein referred to.

Figure 4:
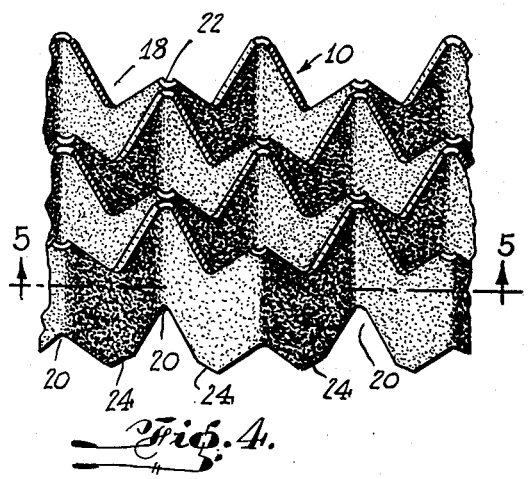
Fig. 4 is a perspective fragmentary view showing a part of a grating made by securing a plurality of corrugated bars together.
Figure 5:
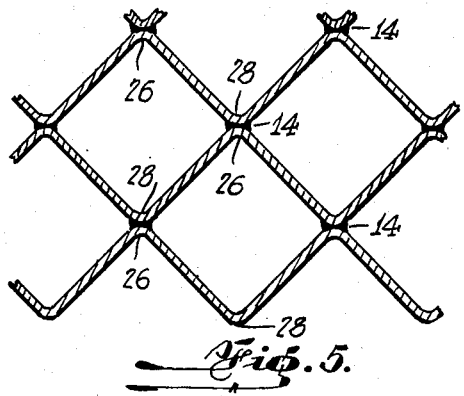
Fig. 5 is a sectional view on the line 5—5 of Fig. 4.
Figure 6:
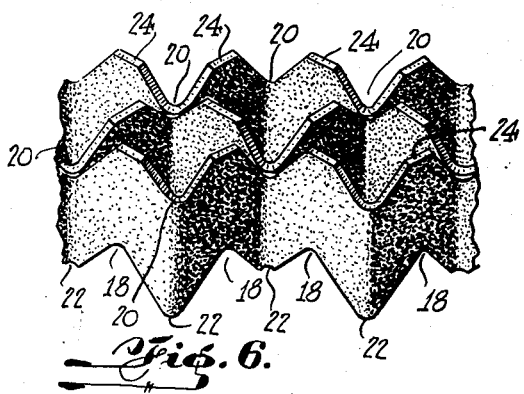
Fig. 6 is a view similar to that of Fig. 4, but showing the opposite side of the grating.

The grating 10 shown in Figs. 4, 5 and 6 is made up of a plurality of corrugated metal bars 12 which are securely fastened together, as by means of welds 14. Flat bar 16 shows the appearance of the corrugated bar before said bar is bent to provide its corrugations. It is, in effect, a blank from which the corrugated bar is made.

Flat bar 16 may be stamped or otherwise formed from suitable bar or strip metal, such as iron or hot or cold rolled steel. It is provided with notches 18 along one of its side edges and with notches 20 along the other of its side edges. Notches 18 and 20 are equally proportioned and equally spaced from each other, but their positions are staggered so that notches 18 are situated between notches 20 and notches 20 are situated between notches 18. The notches are all provided with substantially straight edges or sides, the left edges or sides of notches 18 being substantially parallel to the right edges or sides of notches 20, as viewed in Fig. 1, and the right edges or sides of notches 18 being substantially parallel to the left edges or sides of notches 20. Consequently, the width of notched bar 16 remains substantially constant throughout. This feature provides many advantages, such as freedom from twisting when the bar is bent to corrugated form.

Figure 1:
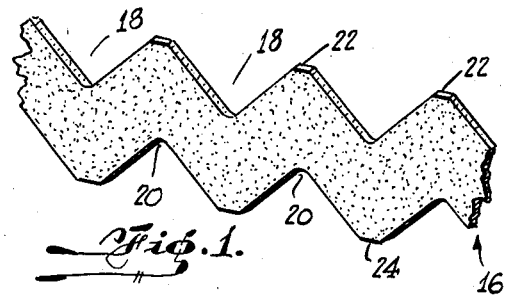

Pointed projections 22 are formed between notches 18 and pointed projections 24 are formed between notches 20. Like the notches, these pointed projections are equally proportioned and equally spaced and the pointed projections 22 are staggered with respect to the locations of pointed projections 24. Thus pointed projections 22 register with notches 20 and pointed projections 24 register with notches 18. It will be understood that the depth and width of the notches and hence the proportions of the pointed projections are matters of design and engineering which may vary in accordance with the requirements of the different uses to which the grating may be put. Thus the pointed projections shown in Fig. 1 may be much too pointed for some applications but much too dull for other applications. The spaces between the pointed projections as shown in Fig. 1 may be much too small in some cases and yet much too large in other cases.

Figure 3:
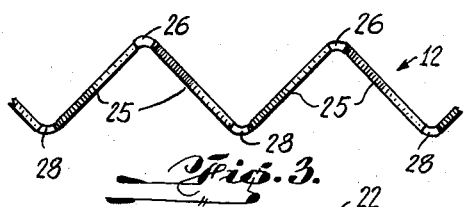
Fig. 3 is a side edge view of the corrugated bar shown in Fig. 2.
Figure 2:
Fig. 2 is a similar view showing the same bar after it has been bent to form transverse corrugations.

Bar 16 may be bent in alternately opposite directions as shown in Fig. 3, to assume the required corrugated form. More specifically, the bend lines on which the notched bar 16 is bent extend transversely of the longitudinal axis of the bar. They are all parallel to each other and each extends from the high point of a pointed projection to the low point of the notch which registers with said pointed projection. This can very readily be seen in Fig. 2. It will be noted in Fig. 3 that those portions 25 of the corrugated bar which lie between the corrugations or bends are straight, flat portions, and it will also be noted that the corrugations or bends are relatively sharp, that is they define an angle of approximately 90°. This, of course, is merely illustrative of the invention and notched bar 16 may be bent either to form even more acute angles or conversely to give it gentler curves along the bend lines and a somewhat sinuous over-all shape.

Viewing the corrugated bar 12 in Fig. 3, it will be seen that it is provided with corrugations or bends 26 along one side thereof and with corrugations or bends 28 along the other side thereof. Corrugations 26 are provided when notched bar 16 is bent in one direction and corrugations 28 are provided when said notched bar is bent in the opposite direction. When a plurality of corrugated bars 12 are placed side-by-side so that corrugations 26 of one bar abut corrugations 28 of the adjacent bar, and said abutting corrugations are welded, riveted or otherwise secured to each other as by means of welds 14, as shown in Fig. 5, a grating 10 is produced. All of the pointed projections on one side of the grating lie on a common plane and all of the pointed projections on the opposite side of the grating also lie on a common plane, parallel to the first-mentioned plane. Since the projections on one side of the grating are substantially identical with the projections on the opposite side of the grating, in number, proportions and spacing, the grating has two usable sides, either of which may be used as the tread on which vehicles may travel and people may stand or walk.

Figure 7:
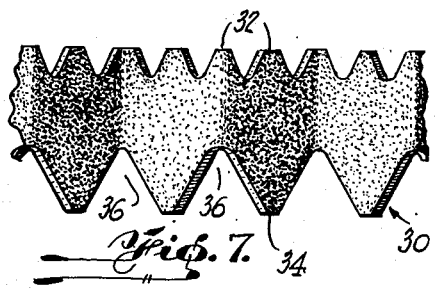
Fig. 7 is a view similar to that of Fig. 2, showing a greater number of pointed projections along one side edge of the bar with smaller spaces between them, than is shown along the corresponding side edge of the bar in Fig. 2.

But identity of the two sides or treads of the grating is not an essential element of the present invention as Fig. 7 clearly shows. A corrugated bar 30 is there shown which is similar to corrugated bar 12 except that it has relatively small projections 32 along one side edge thereof and relatively large projections 34 along the opposite side edge thereof, in contrast to the projections of equal size along both side edges of corrugated bar 12. Pointed projections 32 are not only smaller than pointed projections 34 but they are also spaced closer together. Every other projection 32 registers with a projection 34 and intermediate projections 32 register with the low points of notches 36 between said projections 34. Pointed projections 32 are used where women are employed so as to help prevent the heels of their shoes from catching the projections.

The foregoing is illustrative of the basic principles of the invention, and it will be understood that modifications and changes may be incorporated in the illustrated forms of the invention without departing from its basic principles.

Having thus described my invention, what I claim as new and desire to secure by Letters Patent, is:

1. A grating comprising a plurality of vertically disposed bars, each of said bars being provided along its upper and its lower edge with alternately spaced notches and pointed projections, the apices of the notches along the upper edge vertically aligning with the pointed projections on the lower edge, and the apices of the notches on the lower edge being in vertical alignment with the pointed projections of the upper edge, said bars being bent transversely of themselves in alternately opposite directions along transverse bend lines which extend from the apices of the notches on one edge to the corresponding pointed projections on the other edge, said bars being connected to each other along their respective bend lines to form a plurality of spaced interstices between them and to form on said upper side a plurality of anti-slip points at said lines of connection.

2. A grating comprising a plurality of vertically disposed bars each bent transversely at spaced intervals in alternately opposite directions along vertical bend lines, adjacent bars being connected along their vertical bend lines to form a grating, each of said bars having a V-shaped notch along its upper edge extending from one bend line to the next to form anti-slip points between successive notches at the line of connection, and V-shaped notches along the lower edge of each of said bars, the edges of said lower notches being substantially parallel to the edges of the upper notches whereby the lower notches are staggered with respect thereto, with the apex of the lower notches coinciding with the bend lines.

LEOPOLD BUSTIN.

References Cited in the file of this patent
UNITED STATES PATENTS

| Number | Name | Date |
|---|---|---|
| 684,383 | Ross | Oct. 8, 1901 |
| 1,868,108 | Lachman | July 19, 1932 |
| 1,983,412 | Smith | Dec. 4, 1934 |
| 2,335,181 | Heath | Nov. 23, 1943 |
| 2,554,392 | Turner | May 22, 1951 |
| 2,609,784 | Gruetjen | Sept. 9, 1952 |